United States Patent
Patera et al.

(10) Patent No.: US 8,377,292 B2
(45) Date of Patent: Feb. 19, 2013

(54) WATER FILTER AND DISPENSER SYSTEM

(75) Inventors: Ginger Patera, St. Joseph, MI (US); Donald Bretl, West Chester, OH (US); Dave Emmons, Plymouth, MN (US); John Tanner, Plymouth, MN (US); Juan José Ramos Alvarez, Guadalupe (MX); Mario Togawa Aparicio, Monterrey (MX); Daniel Esparza Cano, San Nicolás de los Garza (MX)

(73) Assignee: Whirlpool Corporation, Benton Harbor, MI (US)

( * ) Notice: Subject to any disclaimer, the term of this patent is extended or adjusted under 35 U.S.C. 154(b) by 1195 days.

(21) Appl. No.: 11/798,606

(22) Filed: May 15, 2007

(65) Prior Publication Data

US 2007/0278141 A1 Dec. 6, 2007

(30) Foreign Application Priority Data

May 15, 2006 (MX) .................... PA/a/2006/005487

(51) Int. Cl.
*B01D 29/60* (2006.01)
*B01D 29/90* (2006.01)

(52) U.S. Cl. ... 210/110; 210/235; 210/473; 222/189.06; 222/146.6; 62/339; 62/188; 141/82; 141/375; 141/198

(58) Field of Classification Search ............... 222/146.6, 222/189.06; 62/188, 339; 141/82, 198, 375; 210/110, 235, 473

See application file for complete search history.

(56) References Cited

U.S. PATENT DOCUMENTS

| | | | |
|---|---|---|---|
| 3,561,506 A * | 2/1971 | Johnson | 141/360 |
| 3,685,357 A * | 8/1972 | Alexander | 73/313 |
| 3,836,000 A * | 9/1974 | Jakubek | 210/104 |
| 3,934,757 A | 1/1976 | Malek et al. | |
| 4,207,994 A | 6/1980 | Offlee, Sr. | |
| 5,096,095 A | 3/1992 | Burton | |
| 5,320,752 A | 6/1994 | Clark et al. | |
| 5,484,538 A | 1/1996 | Woodward | |
| 5,490,547 A | 2/1996 | Abadi et al. | |
| 5,542,265 A | 8/1996 | Rutland | |
| 5,683,015 A | 11/1997 | Lee | |
| 5,737,932 A | 4/1998 | Lee | |
| 5,743,106 A | 4/1998 | Lee | |
| 5,791,523 A | 8/1998 | Oh | |
| 5,813,246 A | 9/1998 | Oh | |
| 5,819,547 A | 10/1998 | Oh | |
| 5,857,596 A | 1/1999 | Lee | |
| 5,862,952 A | 1/1999 | Lee | |
| 5,956,967 A | 9/1999 | Kim | |
| 5,971,213 A | 10/1999 | Lee | |
| 6,003,734 A | 12/1999 | Oh | |
| 6,303,031 B1 | 10/2001 | Senner | |
| 6,337,015 B1 | 1/2002 | Poirier | |
| 6,425,425 B2 | 7/2002 | Bianchi et al. | |
| 6,574,984 B1 | 6/2003 | McCrea et al. | |
| 6,763,976 B2 | 7/2004 | Mitchell et al. | |

(Continued)

*Primary Examiner* — Terry Cecil
(74) *Attorney, Agent, or Firm* — Kirk W. Goodwin

(57) ABSTRACT

The present invention relates to a low pressure water filter and dispenser system for use in a refrigerator which enables an effluent from said system exhibiting a log 6 bacteria reduction and a log 4 virus reduction with pressures as low as 0.35 kg/cm² (5 psi). The system can be located in various places, for example it can sit on the shelf, it can be mounted to the ceiling of the refrigerator, or it can be attached to the wall or other internal components.

15 Claims, 11 Drawing Sheets

U.S. PATENT DOCUMENTS 6,810,682 B1 11/2004 Schuchart et al.
7,658,212 B2 * 2/2010 Meuleners et al. ............ 141/82
2004/0007516 A1 1/2004 Fritze et al.
2004/0129617 A1 7/2004 Tanner et al.

* cited by examiner

WATER FILTER AND DISPENSER SYSTEM

FIELD OF THE INVENTION

The present invention relates to a low pressure filtered purifier device for refrigerator pitcher and reservoir system in which a water pitcher or suitable receptacle is automatically filled with an amount of the water enough to reach a desired water level. The refrigerator pitcher and reservoir system of the present invention uses a new anti microbial filter which enables an effluent from said system exhibits a log 6 bacteria reduction and a log 4 virus reduction with pressures as low as 0.35 kg/cm$^2$ (5 psi).

BACKGROUND OF THE INVENTION

Refrigerator mounted filter systems connected directly to a water supply exist. For example, U.S. Pat. Nos. 6,574,984, 6,337,015, 6,303,031, 5,956,967, 5,819,547, 5,490,547, 5,484,538, 5,320,752, and U.S. patent application Ser. Nos. 10/445,372 and 10/643,669 published as US 2004/0007516 and 2004/0129617, respectively, disclose water filtration systems for refrigerators. These systems can be as simple as individual filters placed on a water line, wherever the manufacturer can find space for them. This type of system is cumbersome for manufacturers to install.

Currently, most of the refrigerator's manufacturers have water dispensers on their side by side refrigerators but they are through the door execution, they do not work with the low water line pressures and do not deliver anti-microbial filtration/purification. Some of them also have developed a through the door top mount execution, but they are manual fill and do not have any filtration. A top mount external dispenser also exists.

Thus, refrigerator mounted dispenser systems connected directly to a water supply exist. For example, U.S. Pat. Nos. 6,810,682, 6,763,976, 6,574,984, 6,425,425, 6,003,734, 5,971,213, 5,956,967, 5,862,952, 5,857,596, 5,819,547, 5,813,246, 5,791,523, 5,737,932, 5,743,106, 5,683,015, 5,542,265, 5,096,095, 4,207,994, and 3,934,757 disclose water dispenser systems for refrigerators. However, a combination of a refrigerator mounted filter system with a refrigerator mounted dispenser system which enables an effluent from said combined system exhibiting a log 6 bacteria reduction and a log 4 virus reduction with pressures as low as 0.35 kg/cm$^2$ (5 psi) is not readily available.

In many countries, the water pressure in the homes varies extensively from house to house, block to block and city to city. The generalized use of water roof top tanks allows a pressure of about 0.70 kg/cm$^2$ (10 psi), for a house of a single story. The pressure in apartments will depend on the height at which the water roof top tank is. This way, most of the houses do not have sufficient water pressure to allow the use of the typical filters of water without the necessity of a pump or another system.

SUMMARY OF THE INVENTION

Accordingly, it is an object of the present invention to provide a combination of a refrigerator mounted filter system with a refrigerator mounted dispenser system which enables an effluent from said combined system exhibiting a log 6 bacteria reduction and a log 4 virus reduction with pressures as low as 0.35 kg/cm$^2$ (5 psi).

In one aspect of the invention, the availability of "purified" water in ready to use quantities for consumers in the refrigerator is new to the market as no other filter/dispenser system on the market can deliver this. The filter/dispenser system comprises the combination of a tap or pitcher that allows for high flexibility for the consumers as they can either leave the pitcher in the refrigerator for cold water, or take it out to warm to ambient temperatures. They also can use the tap to access the water in the reservoir either one glass at a time or fill another pitcher or container for use and still have the water in the pitcher. They can also use the tap to manually fill the ice trays and have safe ice. The system is compact and does not take up much space. Currently many consumers already store water jars in the refrigerator and the additional space for the system is minimal. Also, having low cost water system that removes bacteria and viruses eliminates the need and cost for bottled water. This system can be adapted to side by side, top mount, bottom mount and single door applications as well as outside the refrigerator applications. This system could also be offered as a kit to consumers currently owning refrigerators.

The design of a new anti-microbial by Procter & Gamble®, NILE, gives a registry of reduction of 6 log bacteria and registers a 4 log reduction of virus with as low pressures as 5 psi. This new technology allows for the design of a new water dispenser for refrigerators that will work in low pressure areas.

In a first embodiment of the present invention the water enters the refrigerator through a water line in the back. The water then is passed through the filter and exits into a reservoir which fills at a rate governed by the incoming water line pressure. The water reservoir contains a control including a float system to allow the incoming water to be shut off once the reservoir is full. When the level drops, the float system will signal the water line to be opened again. The purified water in the reservoir is available for consumption by the consumer.

In a second embodiment of the present invention the dispenser has a control to control water to a reservoir and it can also have a removable pitcher that is connected to the reservoir which fills as the reservoir is filling. A pitcher/reservoir "no-leak" interface allows the pitcher to be removed without spilling water and for the reservoir to continue to fill if applicable. When the empty pitcher is re-docked to the reservoir, water will then flow into the pitcher to fill it to a comparable reservoir level and then the float will open up to start filling the reservoir/pitcher system again. The addition of a tap in the dual pitcher/reservoir system can be added to either the pitcher or to the reservoir.

In a third embodiment of the present invention the system can be located in various places. It can sit on the shelf, it can be mounted to the ceiling of the refrigerator, or it can be attached to the wall or other internal components. The reservoir and pitcher can be of various sizes, shapes, and capacity and be transparent or opaque. The location of the filter allows for easy access for changing it by the consumer. The addition of various pumping systems to the reservoir allows access for purified water to automatic icemakers. Also, in cases where it is difficult or not possible to have a water line installed, a pump can be added to a large water jug or container filled with tap, well, or bottled water to feed the filter system.

In a fourth embodiment of the present invention the dispenser is located on the inner door of the refrigerator. The water can be dispensed from the reservoir either through an internal dispensing device requiring the consumer to open the door to access the dispenser or through an external dispensing system through the inner door. The water enters the refrigerator through a water line in the back. It can then go through the hinge into the filter area of the dispenser and then to the reservoir. Another option would be to go to a filter system in the main interior and then pumping it to the door-thus taking less door space. The first option may or may not require a pump to execute. Various designs for the internal door reservoir may be used. The dispenser can be a long narrow device that sits in the door shelf. It can also mount to the door in the location of the various door bins. The shape and size is determined by the amount of water capacity desired as well as the inner door configuration. The filter can be included in the dispenser as or in a separate vessel outside of the dispenser but attached to the dispenser. It can be completely separated from the dispenser and located in the main interior as noted above. In cases where it is difficult or not possible to have a water line installed, a pump can be added to a large water jug or container filled with tap, well, or bottled water to feed the filter system.

In a fifth embodiment of the present invention the reservoir and filter are exterior to the refrigerator. The water line enters the filter system located either on the top or the top/back of the refrigerator. The incoming line pressure drives the water through the filter at a rate dictated by the house pressure. The purified water then is stored into the reservoir. The purified water from the reservoir then is fed by gravity to the icemaker and the internal dispenser/pitcher when required. The water reservoir contains a float system to allow the incoming water to be shut off once the reservoir/pitcher system is full. When the level drops, the float system will signal the water line to be opened again. The external reservoir system can feed any of the internal pitcher systems whether they are located on the shelf, mounted to the roof, side of other internal components. It can also feed systems located on the internal door via a line through the upper door hinge. In cases where it is difficult or not possible to have a water line installed, a pump can be added to a large water jug or container filled with tap, well, or bottled water to feed the filter system.

Other objects, features, and advantages of the present invention will become apparent to those skilled in the art upon consideration of the foregoing description and the appended claims with reference to the accompanying drawings, all of which form a part of the specification, It should be understood, however, that the detailed description and its specific examples, while indicating preferred embodiments of the present invention, are given by way of illustration and not of limitation. Many changes and modifications from the scope of the present invention may be made without departing from the spirit thereof, and the invention includes all such modifications.

BRIEF DESCRIPTION OF THE DRAWINGS

The above and other objects of the invention will become more readily apparent as the invention is more clearly understood from the detailed description to follow, reference being made to the accompanying drawings in which like-reference numerals represent like-parts throughout, and in which.

DETAILED DESCRIPTION OF EMBODIMENTS

Figure 1:
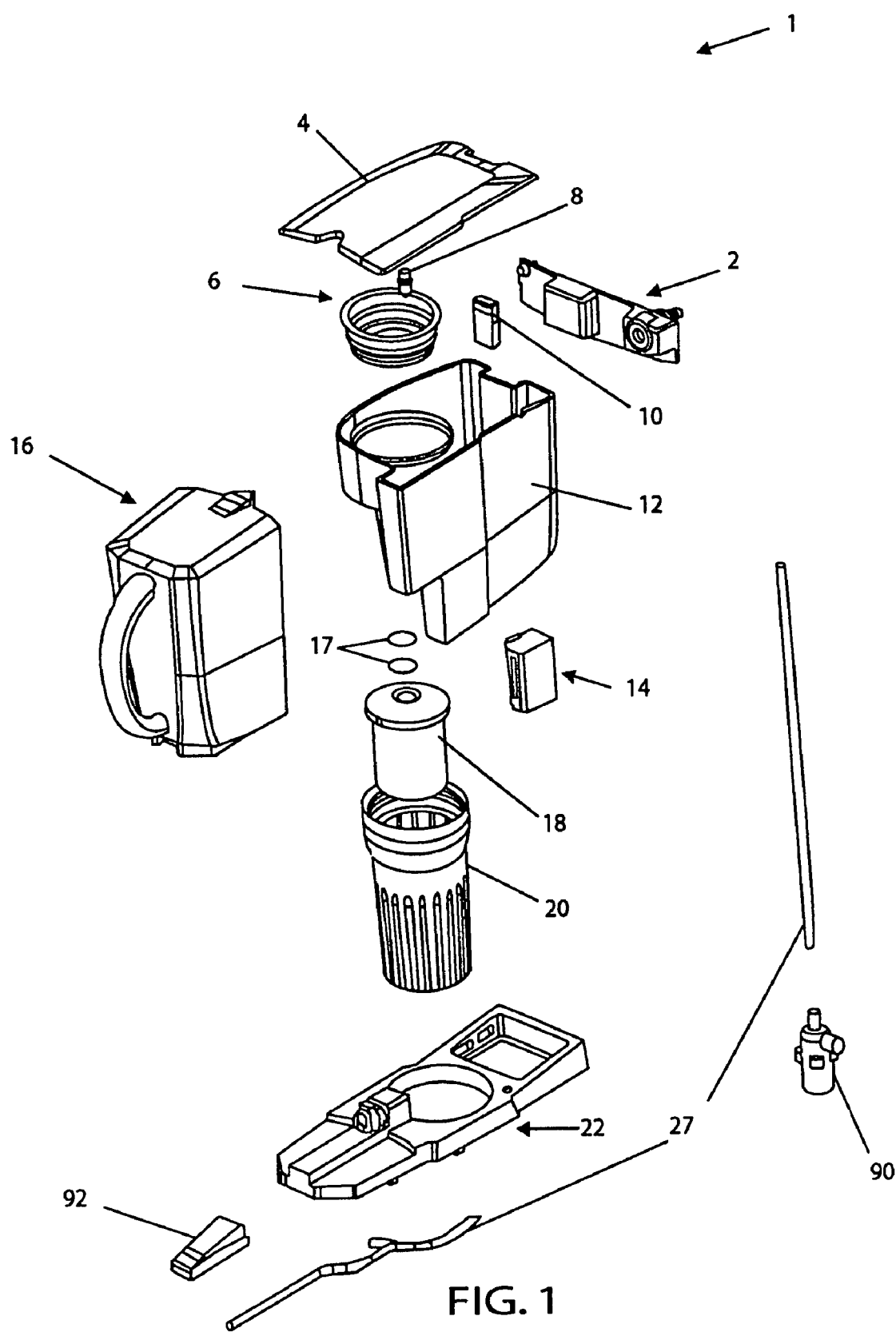
FIG. 1 is an exploded perspective view of a water filter and dispenser system in accordance with a preferred aspect of the present invention.

Referring now particularly to FIG. 1, there is shown a purifying water system (1), which includes a filter (18) working with low water control pressure and enabling an effluent from said system exhibiting a log 6 bacteria reduction and a log 4 virus reduction with pressures as low as 0.35 kg/cm$^2$ (5 psi). The water inlet is located on the back of the refrigerator (not shown) and is directly connected to the domestic water line to the valve solenoid (90) by means of a tube, preferably of copper material. The valve solenoid (90) allows the flow of water through the system when receiving an electrical signal, which will cause that the piston inside thereof is displaced, as based on the theoretical principles of electromagnetism. The valve could include a system allowing regulating the pressure, reducing it to the maximum pressure possible. The water is driven by means of a pipe on the back of the refrigerator and introduced by means of an insertion device having at its end a check valve (30, 38) to connect and/or disconnect the system from the water source.

When the system (1) is empty (without water), the float (10) is in its lower point, which will cause a magnet included into the float to activate a magnetic reed switch (24), which closes the circuit and provides a signal so that the solenoid valve (90) is energized and allows the water to flow. It should be noticed that in order for the magnetic reed switch (24) to be activated by the magnetic float (10), the device must be within the magnetic flux of the magnetic float which is done by correctly positioning the device to the system docking plate (2).

The water flows through the filter (18), first flowing through a second check valve (8) which indicates the presence of the filter (18). If a filter is not in place inside the vessel (20), it would not be possible to obtain unfiltered water from the system (1).

The water then flows to the water reservoir (12), until the water level sensor on the float (10) shuts it off. The magnetic float (10) is moved outside of the zone of action of the magnetic field thereby deactivating the magnetic reed switch (24) and consequently interrupting the operation of the solenoid valve (90). If a removable pitcher or jar (16) is connected to the reservoir (12), the water would flow through a third check valve (64, 68) (see FIGS. 6 and 7) and will simultaneously fill both the reservoir (12) and the pitcher or jar (16) until a maximum point is reached where the magnetic reed switch (24) is disconnected by being outside of the magnetic field produced by the magnetic float (10). The third check valve (64, 68) operates to prevent the water from flowing if the pitcher (16) is not in place. In addition, leakage and/or excessive dripping when connecting and/or disconnecting the pitcher or jar (16) are prevented by the third check valve (64, 68).

It should be understood that the check valves operate like sensors to prevent undesired flow of water during certain condition of the operation of the water filter and dispenser system of the present invention.

The water filter and dispenser system (1) could optionally include a dispenser water valve or tap (92) which could allow filtered water to be obtained directly from the reservoir (12) without the necessity to disconnect the pitcher or jar (16) Pitcher or tap (92) is located at the frontal portion of the water filter and dispenser system or device (1) to dispense water easier from the reservoir (12).

Figure 2:
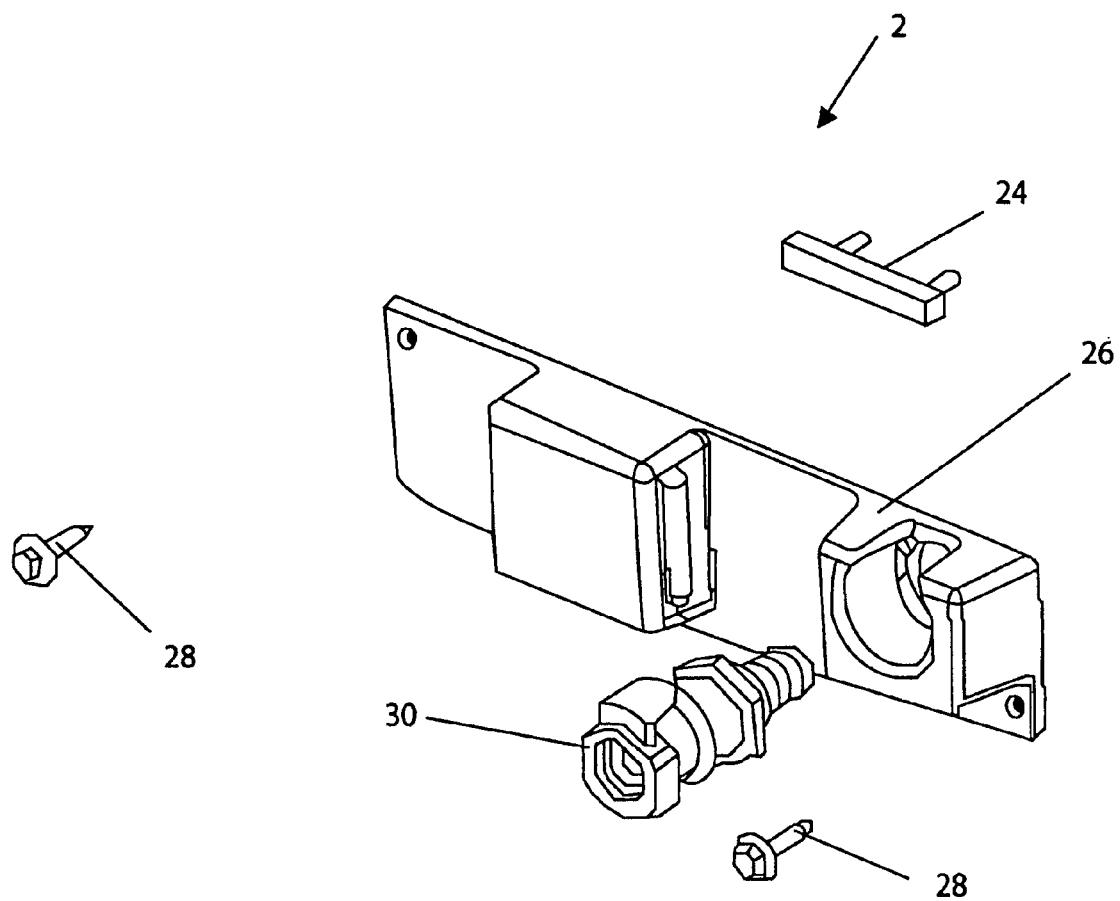
FIG. 2 is an enlarged exploded perspective view of a docking plate of the water filter and dispenser system in accordance with a preferred aspect of the present invention.

Referring to FIGS. 1 and 2, the system docking plate (2) supports and holds the reservoir or vessel (12) in a correct position inside the refrigerator. The system docking plate (2) is attached to the refrigerator liner by fastener means such as screws (28). The plastic structure docking plate (26) covers the magnetic reed switch (24) which activates the solenoid valve (90). The system docking plate (2) further comprises a check valve (30) through which water is received from a feeding water inlet line outside the refrigerator and the whole system is connected through the check valve (30) to avoid water leakage when the system is connected and/or disconnected from the refrigerator.

Figure 3:
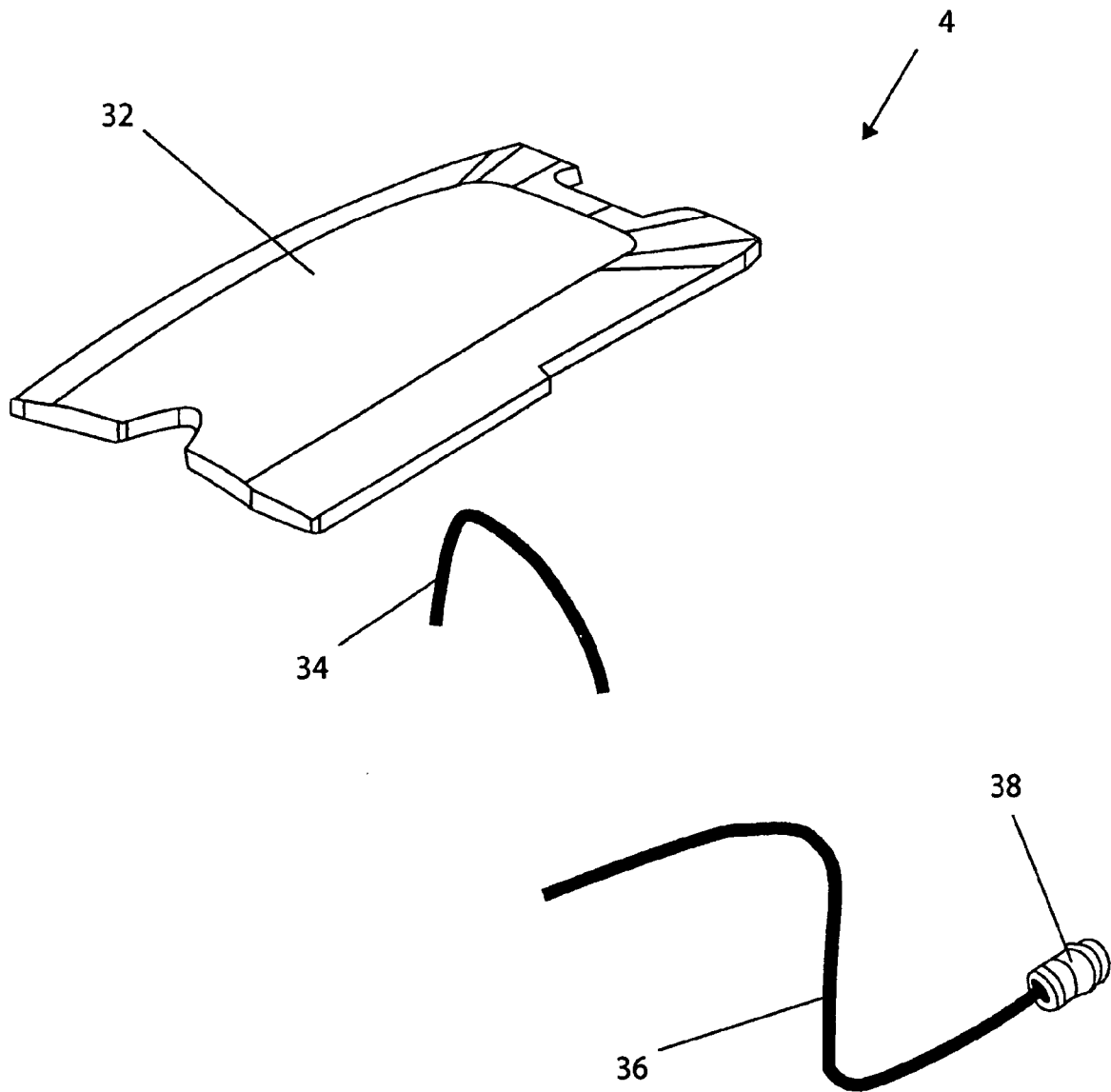
FIG. 3 is an enlarged perspective view of a reservoir lid of the water filter and dispenser system in accordance with a preferred aspect of the present invention.

Referring to FIGS. 1 and 3, the reservoir lid (4) covers the top of the reservoir (12). The reservoir lid (4) comprises a lid body (32) and hoses (34, 36). At one end of hose (36) is a connector having the check valve (38) included therein for connecting the system with the water feeding line outside the refrigerator to supply water to the reservoir (12) of the water filter and dispenser system (1). As it was pointed out before, the connector having the check valve (38) prevents water leakage when the system is connected and/or disconnected from the refrigerator. Whereas the hose (34) being able to conduct water from the vessel (20) to the reservoir (12) after flowing through the filter (18).

Figure 4:
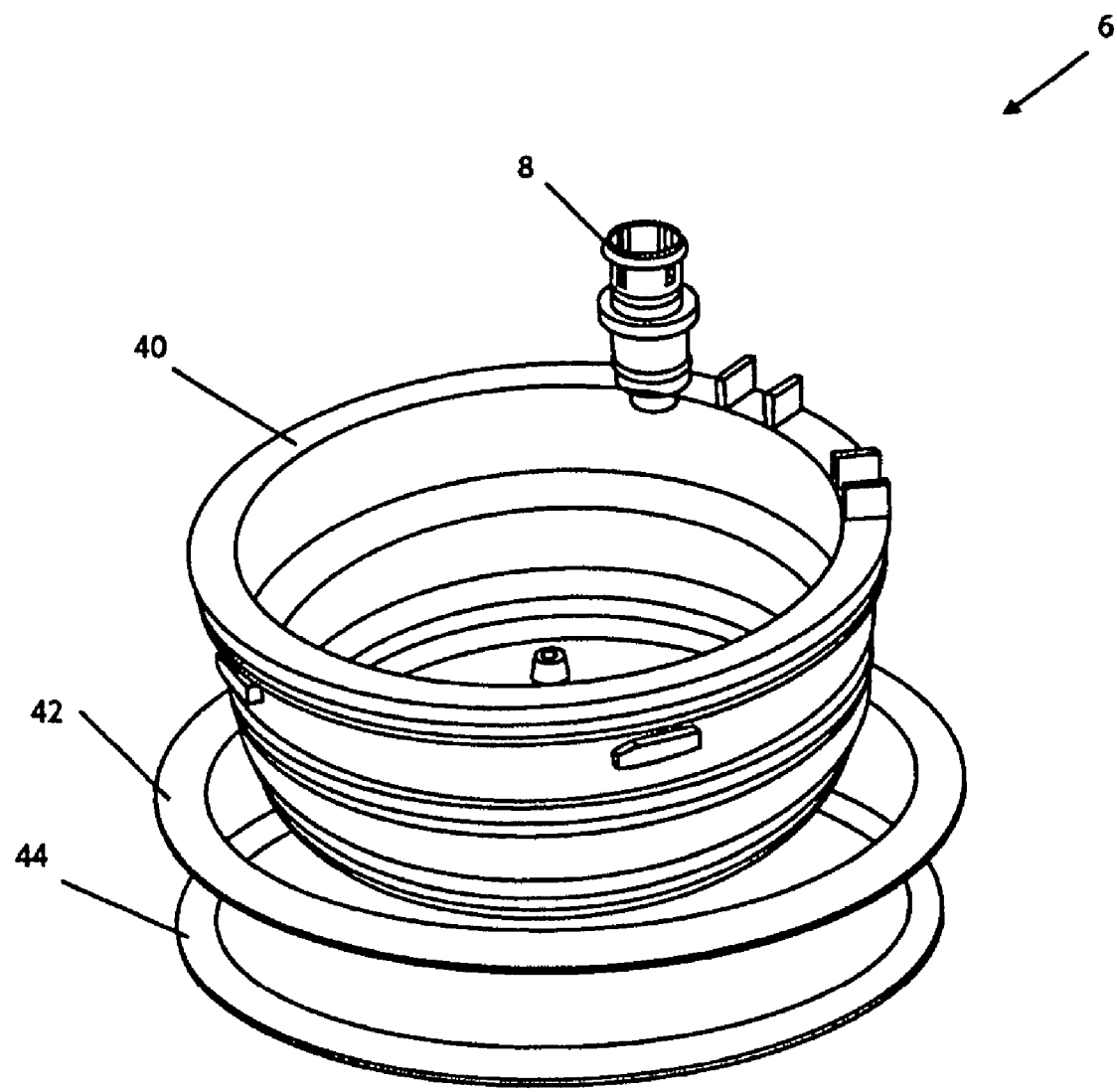
FIG. 4 is an enlarged perspective view of a head of the water filter and dispenser system in accordance with a preferred aspect of the present invention.

Referring to FIGS. 1 and 4, the head (6) includes a substantially cylindrical head structure (40) and two "O" rings (42, 44) which cooperate in providing a sealed coupling between the head (6) and the vessel (20). In addition, another two "O" rings (17) are provided along with the filter (18) within the vessel (20) in order to prevent water leakage from the vessel (20). If some water leak age were present at this point, it would not be filtered water. The head (6) further comprises a check valve such as a filter sensor (8) allowing the flow of water with the proviso that a filter (18) is installed in place. In other words, if a filter (18) is not in place within the vessel (20), no water will be provided by the system (1), particularly unfiltered water.

Figure 5:
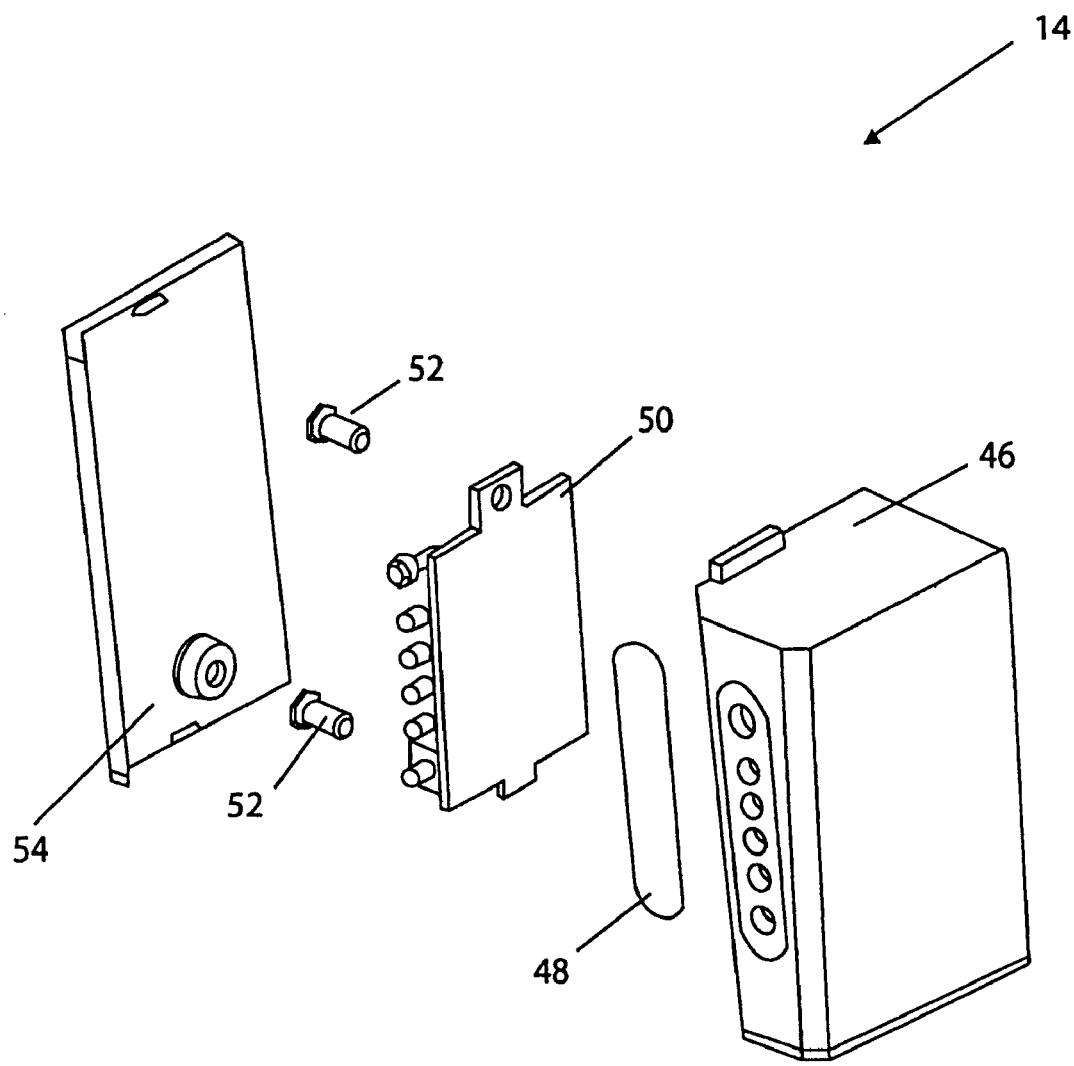
FIG. 5 is an enlarged exploded perspective view of a display of the water filter and dispenser system which indicates the operational life of the filter in accordance with a preferred aspect of the present invention.

Referring to FIGS. 1 and 5, the water filter and dispenser system (1) further comprises a display (14) to indicate the operating lifetime of the filter (18) to the consumer. The display (14) comprises a control including an electronic card or PC timer (50) placed inside the display and mounted on a base (54) by fastener means such as screws (52). After the PC timer control (50) has been duly assembled, it is covered by a cover (46) to protect the electronic card from being in contact with water. The PC timer (50) also includes a plurality of LEDS, which will be progressively turned off as time goes by indicating when the filter (18) needs to be replaced by a new one. The display (14) further comprises a label such as an overlay (48) placed on the cover (46) covering the LEDS of the PC timer (50).

Figure 6:
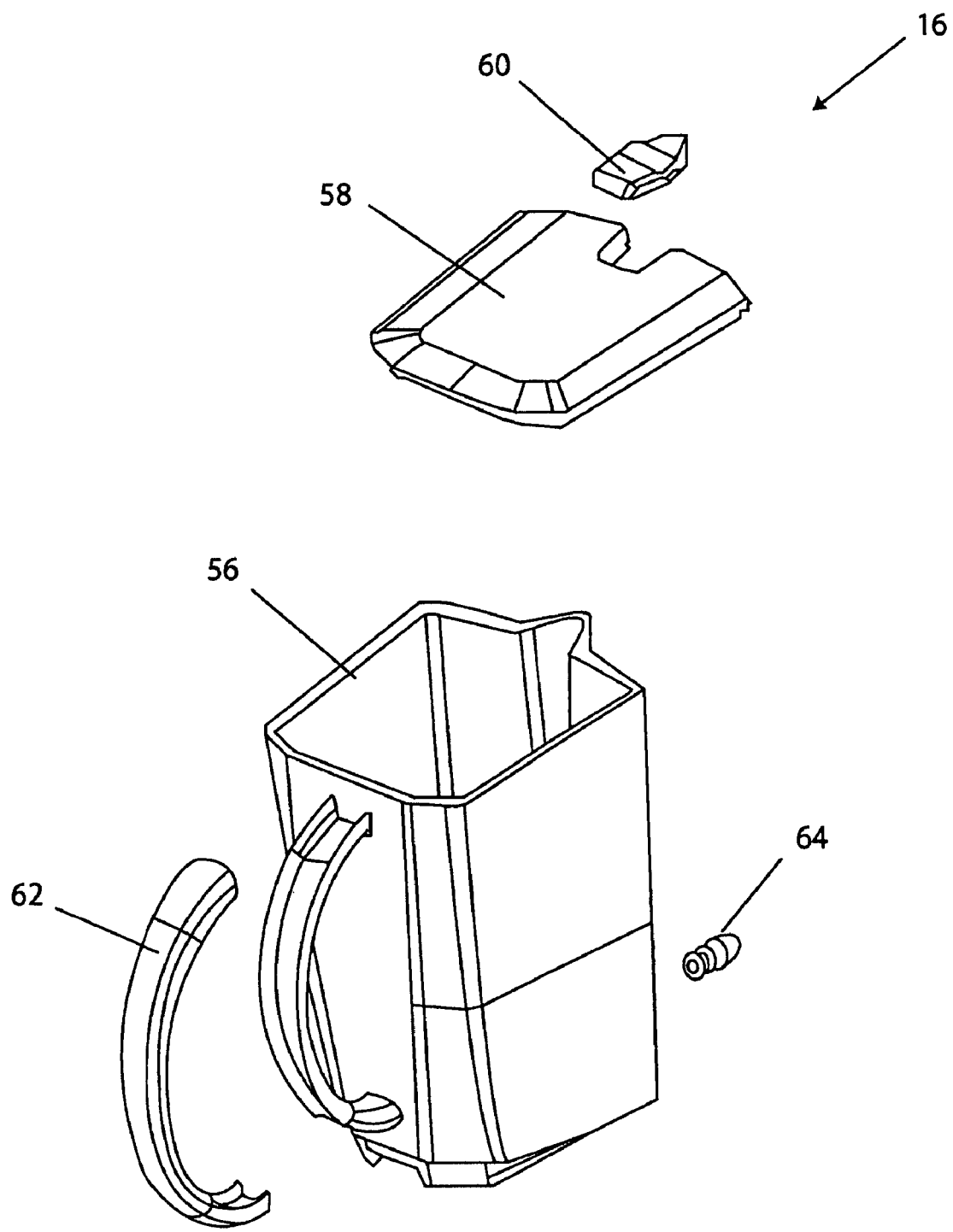
FIG. 6 is an enlarged exploded perspective view of a pitcher of the water filter and dispenser system in accordance with a preferred aspect of the present invention.
Figure 7:
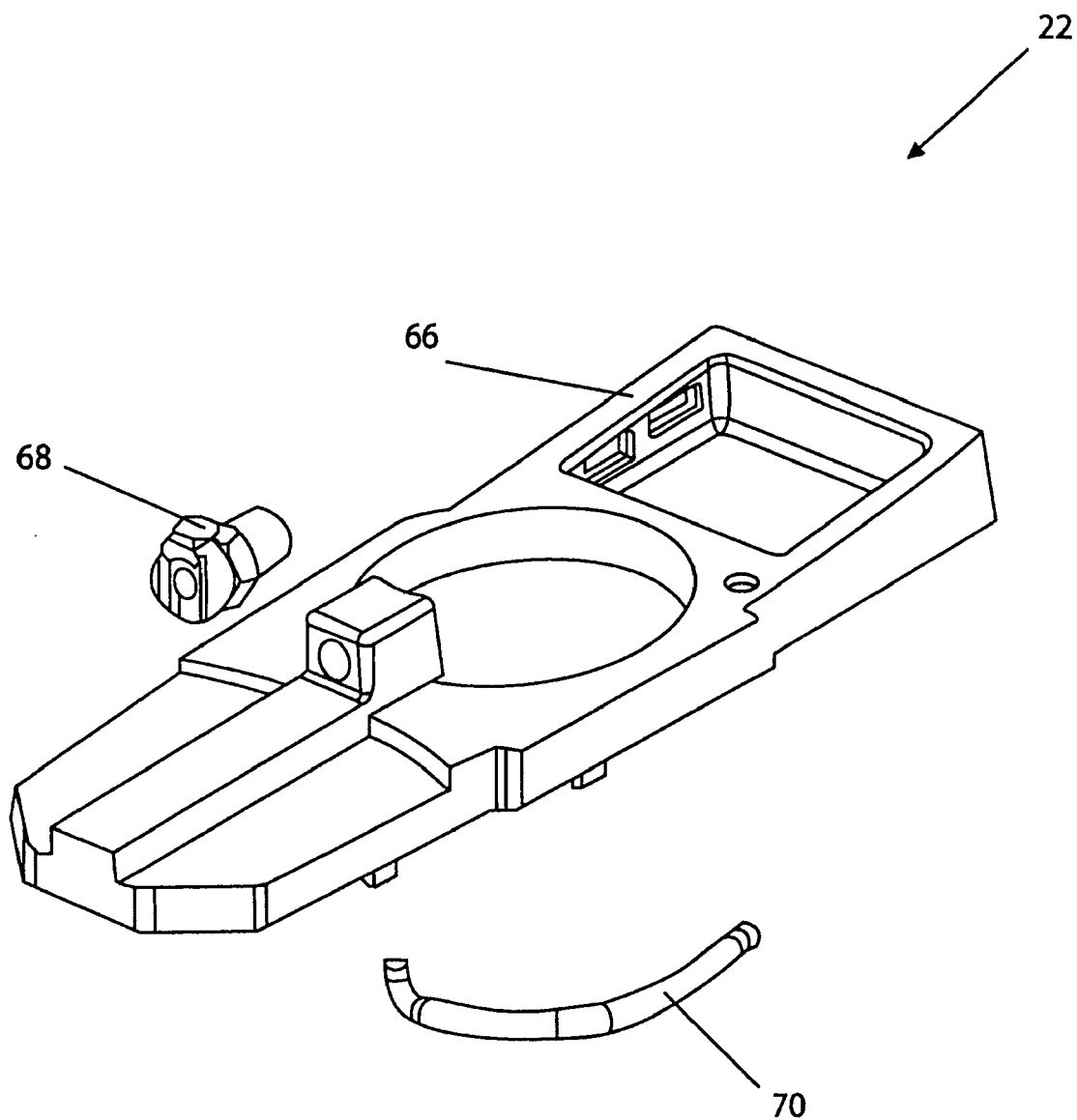
FIG. 7 is an enlarged exploded perspective view of a base of the water filter and dispenser system in accordance with a preferred aspect of the present invention.

Referring to FIGS. 1 and 6, the water filter and dispenser system (1) further comprises a removable recipient, pitcher or jar (16) incorporated in a jar body (56) including a handle back (62) for ornamental purposes only, a check valve (64) which is in the form of a quick male connector. An interface is formed between the check valve (64) which is in the form of a quick male connector and a check valve (68) which is in the form of a quick female connector and installed in the base (22) as shown in FIG. 7. Such an interface allows the flow of filtered water stored in the reservoir (12). The jar (16) is in fluid communication with the reservoir (12) by said interface. The jar (16) further comprises a lid (58) and a sub-lid (60) for keeping the jar sealed and preventing odor transfer from refrigerated food inside the refrigerator to the filtered water.

Referring to FIGS. 1 and 7, the water filter and dispenser system (1) further comprises the base (22) including a base body (66) to support the water filter and dispenser system or device (1), a hose (70) to conduct water from the reservoir (12) to the pitcher (16), and a check valve (68) which is in the form of a quick female connector and provides said interface with the check valve (64) which is in the form of a quick male connector to prevent water leakage when the jar (16) is connected and/or disconnected from the reservoir (12) through the said interface.

As shown in FIG. 1, hoses (27) are provided in the water filter and dispenser system or device (1) for distributing water through the system and keep it in fluid communication.

Screw anchors (not shown) may be provided between the liner and the isolation material of the refrigerator to receive fasteners means such as screws (28) to improve the strength of the liner and thereby preventing the docking plate (26) from being separated from the liner of the refrigerator.

Figure 8:
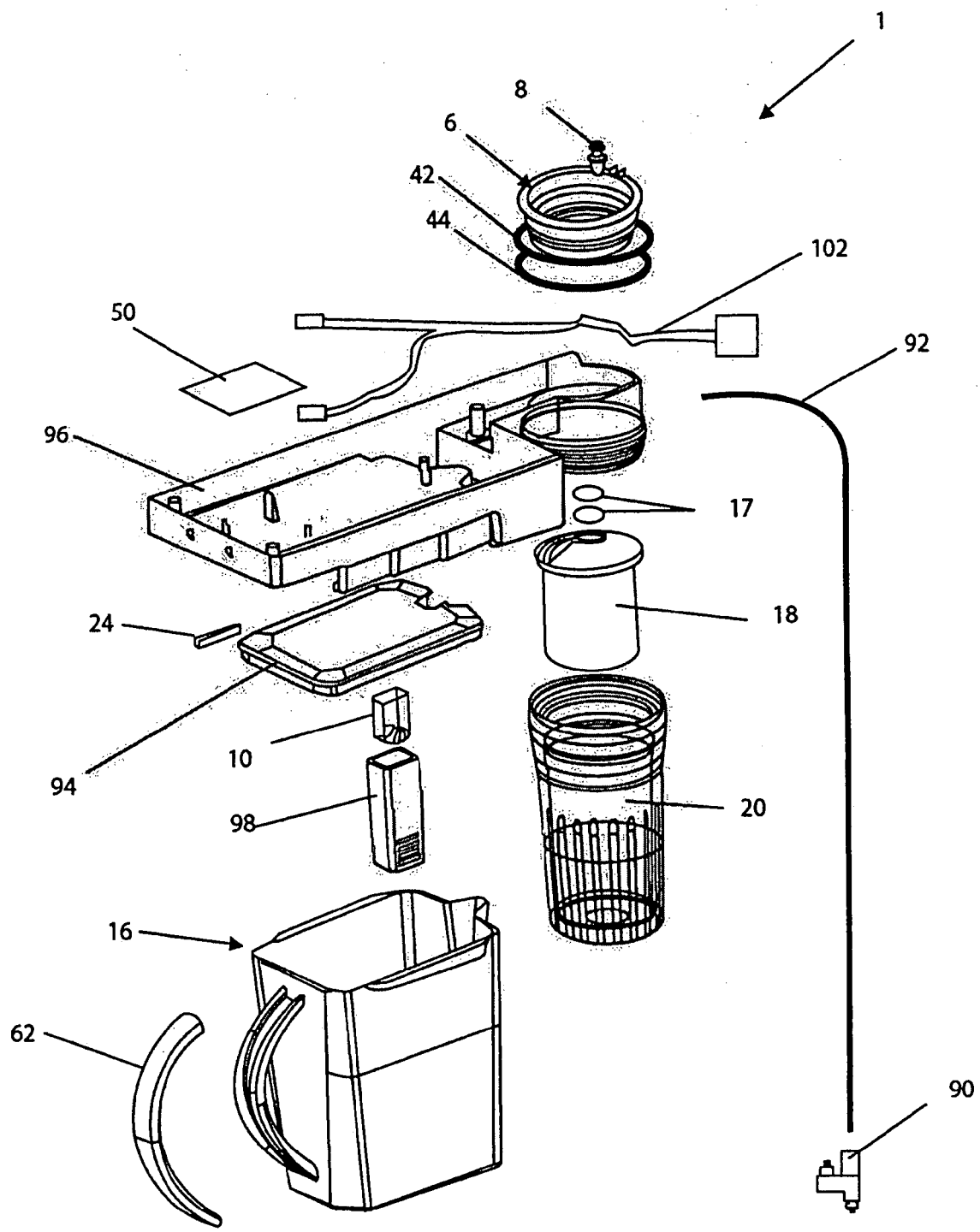
FIG. 8 is an exploded perspective view of the water filter and dispenser system adapted to be mounted to the ceiling of a refrigerator in accordance with a preferred aspect of the present invention.

Referring to FIG. 8, a second embodiment is shown wherein the water filter and dispenser system or device (1) is adapted to be mounted to the ceiling of a refrigerator in accordance with a preferred aspect of the present invention.

A water supply inlet may be positioned in the back of the refrigerator and connected to a solenoid valve (90) through a tube, preferably of copper material. The valve solenoid (90) allows the flow of water through the system when receiving an electrical signal, which will cause that the piston inside thereof is displaced, as based on the theoretical principles of electromagnetism. The valve could include a system allowing regulating the pressure, reducing it to the maximum pressure possible. The water is driven by means of a pipe (92) on the back of the refrigerator.

When the system or device (1) is empty (without water), the magnetic float (10), which is connected to the lid (94) of the pitcher or jar (16), is in its lower maximum point. The magnetic float (10) magnetically activates the magnetic reed switch (24) which in turn closes an electrical circuit and provides a signal to energize the solenoid valve (90) thereby allowing the flow of water.

The magnetic float displacement is perpendicularly controlled by a cover (98) which is assembled along with the lid (94) of the jar (16).

It should be noticed that in order for the magnetic reed switch (24) to be activated by the magnetic float (10), the device must be within the magnetic flux of the magnetic float which is done by correctly positioning the jar (16) to the system support housing (96).

The incoming water flows through filter (18) which is in fluid communication with a check valve (8) sensing the presence of filter (18) so that if there is no a filter (18) in place, that is within the vessel (20), it would be not possible to dispense unfiltered water from the system or device (1). The vessel (20) is connected to the system support housing (96) by means of the head (6) including "O" rings (17) to prevent water leakage or dripping.

Water is directly stored in the pitcher or jar (16) until flowing water moves the magnetic float (10) outside of the zone of action of the magnetic field thereby deactivating the magnetic reed switch (24) and consequently interrupting the operation of the solenoid valve (90).

The water filter and dispenser system or device (1) further comprises a PC timer (50) to indicate the operating lifetime of the filter (18) to the consumer. The PC timer (50) comprises a plurality of LEDS, which will be progressively turned off as time goes by indicating when the filter (18) needs to be replaced by a new one.

An electrical harness (102) is provided to electrically connect all electrical and electronic components such as the PC timer (50), the magnetic reed switch (24), the solenoid valve (90), etc.

Figure 9A:
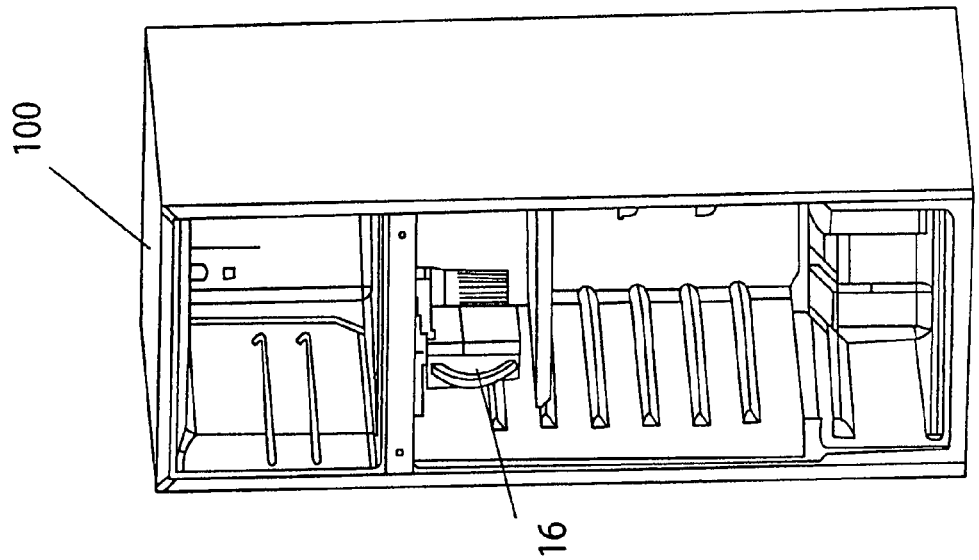
FIG. 9A is a schematic vertical front elevation showing the water filter and dispenser system mounted to the ceiling of a refrigerator in accordance with a preferred aspect of the present invention.
Figure 9B:
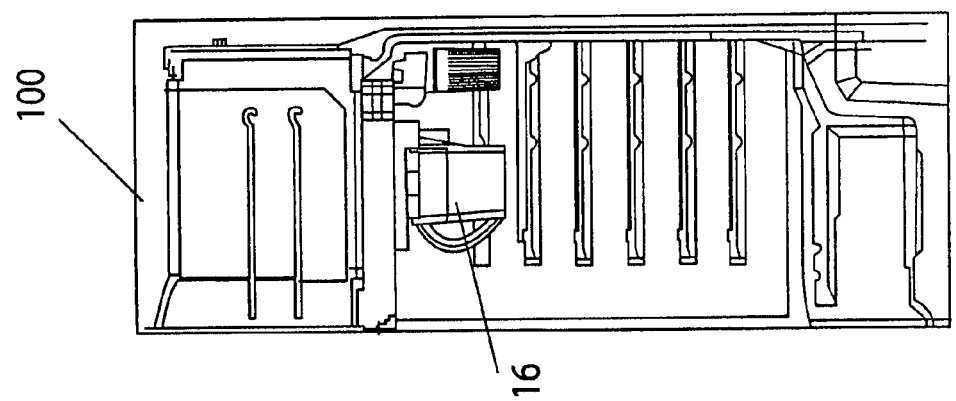
FIG. 9B is a side cross-sectional view showing the water filter and dispenser system mounted to the ceiling of a refrigerator in accordance with a preferred aspect of the present invention.
Figure 9C:
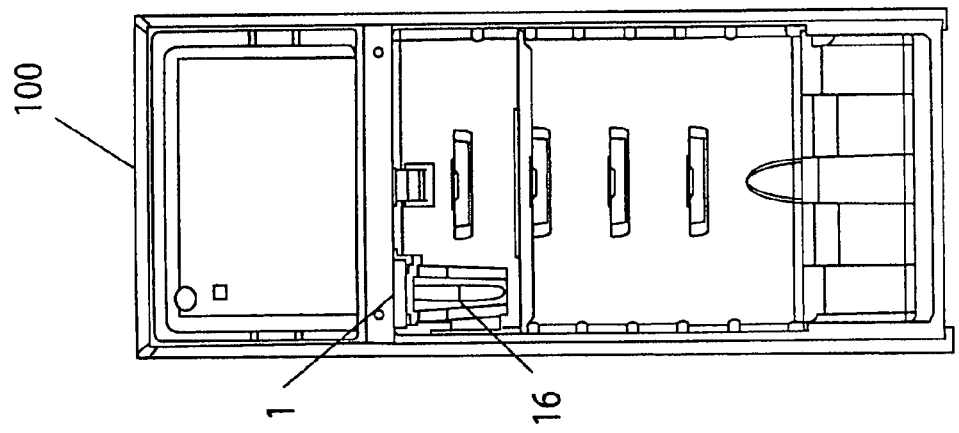
FIG. 9C is a front perspective view showing the water filter and dispenser system mounted to the ceiling of a refrigerator in accordance with a preferred aspect of the present invention.

Referring to FIGS. 9A, 9B and 9C, it is shown the water filter and dispenser system or device (1) mounted to the ceiling of a refrigerator (100) in accordance with a preferred embodiment of the present invention.

Figure 10:
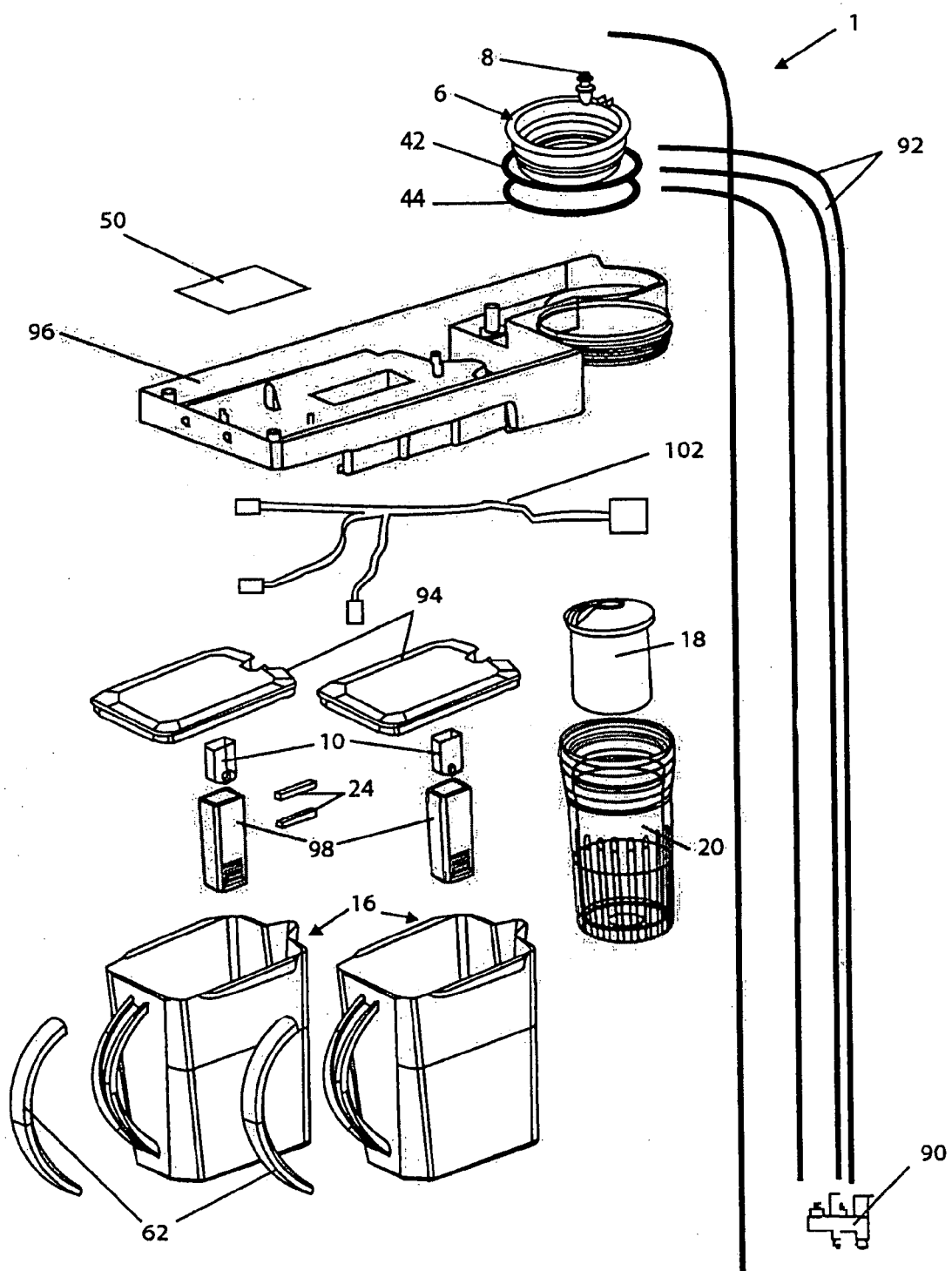
FIG. 10 is an exploded perspective view of the water filter and dispenser system adapted to be mounted to the ceiling of a refrigerator with dual pitchers or jars in accordance with a preferred aspect of the present invention.

Referring to FIG. 10, a third embodiment is shown wherein the water filter and dispenser system or device (1) is adapted to be mounted to the ceiling of a refrigerator in accordance with a preferred aspect of the present invention but including dual jars (16). The description made in connection with FIG. 8 applies for this third embodiment with the exception that the water filter and dispenser system or device (1) comprises two jars (16) instead of one as in the second embodiment of the present invention. In addition, each pitcher is individually filled and shut-off, and each pitcher can be a fixed or a removable one.

Figure 11C:
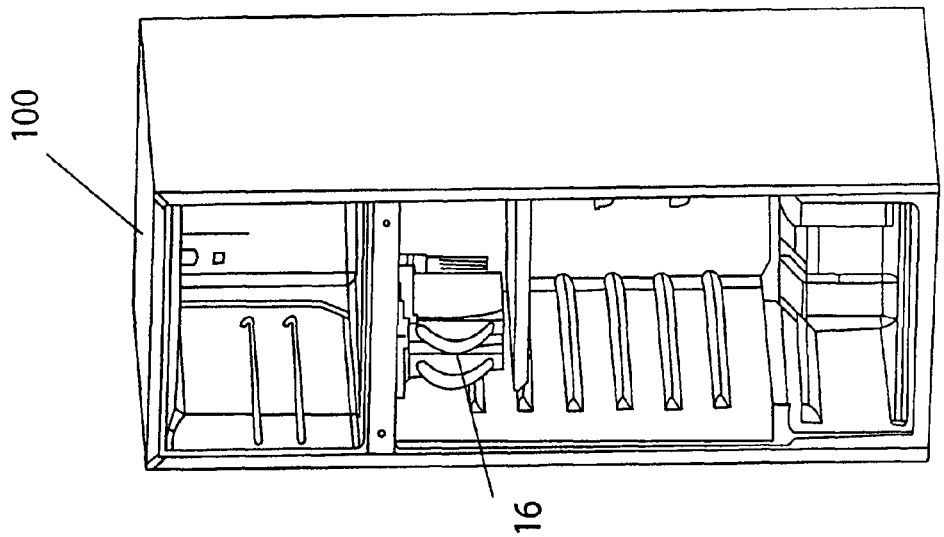
FIG. 11C is a front perspective view showing the water filter and dispenser system mounted to the ceiling of a refrigerator with dual jars in accordance with a preferred aspect of the present invention.
Figure 11B:
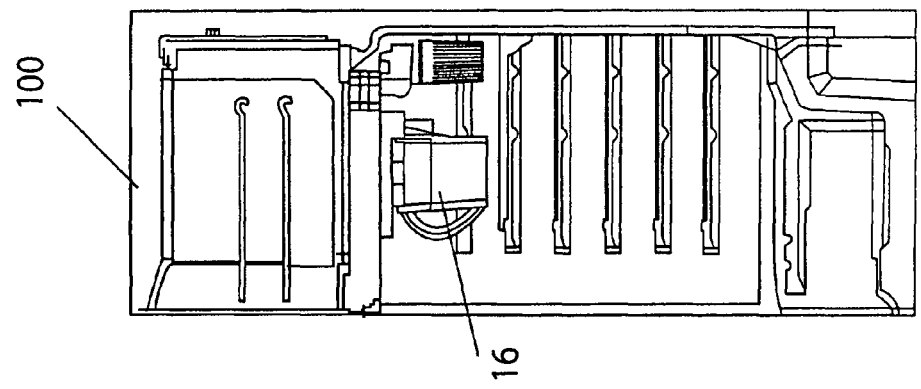
FIG. 11B is a side cross-sectional view showing the water filter and dispenser system mounted to the ceiling of a refrigerator with dual jars in accordance with a preferred aspect of the present invention.
Figure 11A:
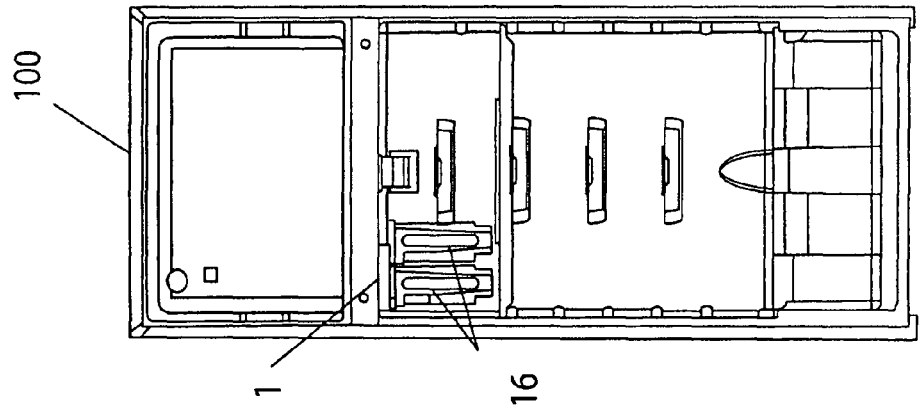
FIG. 11A is a schematic vertical front elevation showing the water filter and dispenser system mounted to the ceiling of a refrigerator with dual jars in accordance with a preferred aspect of the present invention.

Referring to FIGS. 11A, 11B and 11C, it is shown the water filter and dispenser system or device (1) mounted to the ceiling of a refrigerator (100) with two jars (16) in accordance with a preferred embodiment of the present invention.

It will be appreciated that alternative embodiments falling within the scope of the present invention may be apparent to those skilled in the art and accordingly the present invention should not be limited to those embodiments herein described.

What is claimed is:

1. A low pressure water filter and dispenser system comprising:
    an anti-microbial filter for providing a filtered effluent from the system with a log 6 bacteria reduction and a log 4 virus reduction at an incoming water line pressure range from about 0.35 kg/cm2 (5 psi) to about 0.70 kg/cm2 (10 psi);
    at least one pitcher including a body and a male quick connector secured to a lower end of the body,
    at least one reservoir in fluid communication with the filter, the reservoir being sized to store water therein,
    at least one pitcher/reservoir interface including (i) a vessel having the filter positioned therein, and (ii) a base supporting a lower end of the vessel and the lower end of the body of the at least one pitcher, the base including a female quick connector in fluid communication with the at least one reservoir, wherein the at least one pitcher is removably coupled to the base and the male quick connector of the at least one pitcher is engaged with the female quick connector of the base such that water from the at least one reservoir is permitted to flow to the at least one pitcher; and
    auto-filling and auto-shut off control for controlling the flow of water into the at least one pitcher and the at least one reservoir and for ceasing the flow of water thereinto;
    wherein the at least one pitcher and the at least one reservoir are filled with water at a predetermined level of water and at a rate governed by the incoming water line pressure and wherein the at least one pitcher is automatically refilled by the at least one reservoir by gravity flow.

2. The low pressure water filter and dispenser system of claim 1, comprising two removable pitchers, two reservoirs and two pitcher/reservoir interfaces.

3. The low pressure water filter and dispenser system of claim 1 or 2, wherein the system is provided as a kit to consumers currently owning a refrigerator for mounting the kit therein.

4. The low pressure water filter and dispenser system of claim 2, wherein each pitcher is individually filled and shut-off.

5. The low pressure water filter and dispenser system of claim 4, wherein the system is mounted to a ceiling of a refrigerator.

6. The low pressure water filter and dispenser system of claim 5, wherein the system is provided as a kit to consumers currently owning a refrigerator for mounting the kit therein.

7. The low pressure water filter and dispenser system of claim 6, wherein the auto-filling and auto-shut off control comprise a magnetic float integrated into at least one of the pitchers and connected to a lid of at least one of the pitchers, the magnetic float magnetically activating a magnetic reed switch which in turn closes an electrical circuit and provides a signal to energize a solenoid valve thereby allowing the flow of water.

8. The low pressure water filter and dispenser system of claim 7, wherein water is directly stored in the at least one of the pitchers until flowing water moves the magnetic float outside of the zone of action of the magnetic field thereby deactivating the magnetic reed switch and consequently interrupting the operation of the solenoid valve.

9. The low pressure water filter and dispenser system of claim 3, wherein the system is placed on the shelf of a refrigerator.

10. The low pressure water filter and dispenser system of claim 3, wherein the system is mounted to a ceiling of a refrigerator.

11. The low pressure water filter and dispenser system of claim 3, wherein the system is attached to a wall or other internal components of a refrigerator.

12. The low pressure water filter and dispenser system of claim 1, wherein the auto-filling and auto-shut off control comprises a magnetic float and magnetic reed switch interacting to trigger fill-shut off.

13. The low pressure water filter and dispenser system of claim 1, further comprising a tap integrated into the at least one pitcher.

14. The low pressure water filter and dispenser system of claim 13, wherein the water dispensed from the system is purified water.

15. The low pressure water filter and dispenser system of claim 1, wherein the at least one pitcher and at the least one reservoir are filled with filtered effluent from the anti-microbial filter.

* * * * *